United States Patent [19]

Quinn

[11] Patent Number: 5,303,289
[45] Date of Patent: Apr. 12, 1994

[54] COMMUNICATION TRANSFER IN A CELLULAR RADIOTELEPHONE SYSTEM

[75] Inventor: Robert O. Quinn, Wheeling, Ill.

[73] Assignee: Motorola, Inc., Schaumburg, Ill.

[21] Appl. No.: 743,656

[22] Filed: Aug. 12, 1991

[51] Int. Cl.[5] .......................................... H04M 11/00
[52] U.S. Cl. ...................................... 379/60; 455/332
[58] Field of Search ............................ 379/60, 59, 63; 455/33.1, 33.2, 33.3, 56.1

[56] References Cited

U.S. PATENT DOCUMENTS

| | | | |
|---|---|---|---|
| 4,696,027 | 9/1987 | Bonda | 379/60 |
| 4,765,753 | 8/1988 | Schmidt | 379/60 |
| 4,926,421 | 5/1990 | Kawano et al. | 455/33.2 |
| 4,972,456 | 11/1990 | Kaczmarek et al. | 455/33.2 |
| 5,109,528 | 4/1992 | Uddenfeldt | 379/60 |
| 5,175,867 | 12/1992 | Wejke et al. | 455/56.1 |

FOREIGN PATENT DOCUMENTS

| | | | |
|---|---|---|---|
| 0007725 | 1/1989 | Japan | 455/33.2 |
| 0020739 | 1/1989 | Japan | 455/33.2 |
| 0253329 | 10/1989 | Japan | 455/33.2 |

Primary Examiner—Curtis Kuntz
Assistant Examiner—Dwayne D. Bost
Attorney, Agent, or Firm—Val Jean F. Hillman

[57] ABSTRACT

During the handoff of a mobile unit (225) between a serving or source base-site (200) and a selected target base-site, (205 or 210) the target base-site (205 or 210) is directed to tune to and monitor the mobile unit's in progress call on a serving base-site channel frequency in order to verify target cell selection immediately before the handoff. Thereafter, the mobile unit (225) is directed to tune to a selected target base-site channel by the target base-site. Next, the target base-site (205 or 210) re-tunes itself to the selected target channel frequency and continues to transmit. Upon the arrival of the mobile unit onto the selected target channel, the serving base-site channel is released.

18 Claims, 3 Drawing Sheets

COMMUNICATION TRANSFER IN A CELLULAR RADIOTELEPHONE SYSTEM

FIELD OF THE INVENTION

The present invention relates generally to cellular radiotelephone systems, and more particularly to cellular radiotelephone systems employing communication transfers to assure call maintenance.

BACKGROUND OF THE INVENTION

In cellular radiotelephone communication systems, call handoffs are often required in order to maintain communication with mobiles as they move within the system. Handoff is the process whereby an in progress call is transferred from one RF coverage area (cell) to another in coordination with a mobile's movements. It is also the process whereby a call is transferred to another channel within a cell because of interference within the cell. The process of handing off an in progress call is one of the most delicately balanced functions relating to cellular radiotelephone systems and service because of the high level of coordination required among various system processing elements. Thus, failure to hand a call off at the proper time may result in problems like, reduced call quality, interference with neighboring coverage areas and even the undesired termination of the call.

In order to effectuate successful handoffs, current analog cellular systems continuously monitor the quality of every call which is operational on the system. The system must recognize when the quality of a call falls below a predetermined threshold in a particular cell and must also determine what other neighboring cell can satisfactorily handle the call. Once a more suitable candidate is identified, the system sends instructions to the mobile directing it to tune to another channel. The mobile confirms that it is leaving its current channel, tunes to the new channel, synchronizes to the new channel and begins transmitting.

As will be appreciated, in analog cellular systems, handoff processing is dependant on the state transitions of various supervisory signals generated by the mobile unit. Unfortunately, interfering mobile units can falsify these signals, thereby causing poor call quality during handoffs, or in some cases causing a calls termination.

In digital cellular radiotelephone systems, the procedure is modified somewhat in that the mobile measures channels in other cells as well as its current serving channel and reports these measurements, consisting of signal strength back to the system. Since, the mobile cannot determine whether its measurements are as a result of interference, the system must in addition, scan for the mobile in the cell selected by the mobile. Unfortunately, the system scan occurs after the quality of the in progress call has fallen below a predetermined threshold. Thus, while mobile assisted handoff tends to reduce the number of candidate target cells, no real improvement in call quality during the handoff is achieved.

It would be extremely advantageous therefore to provide a handoff procedure which is less susceptible to interference and provides some degree of fault tolerance.

SUMMARY OF THE INVENTION

Briefly described, the present invention is a method for performing mobile unit handoffs between a serving or source base-site and a selected target base-site, each under the direction and control of a mobile telephone switching office (MTSO). In this effort, the target base-site is directed to tune to and monitor the mobile unit's in progress call on a source base-site channel frequency. Thereafter, the mobile unit is directed, by the target base-site, to tune to a selected target base-site channel. Next, the target base-site re-tunes itself to the selected target channel frequency and begins to transmit. Upon the arrival of the mobile unit onto the selected target channel, the source base-site channel is released.

It is a first advantage of the present invention, that the source base-site's involvement in directing the mobile unit to handoff is reduced.

It is another advantage of the present invention, that the source base-site continues to service the mobile until target base-site verification is received by the MTSO.

It is yet another advantage of the present invention that three party conference call circuits are no longer required at the MTSO in order to route audio during a handoff.

DESCRIPTION OF A PREFERRED EMBODIMENT

Figure 1:
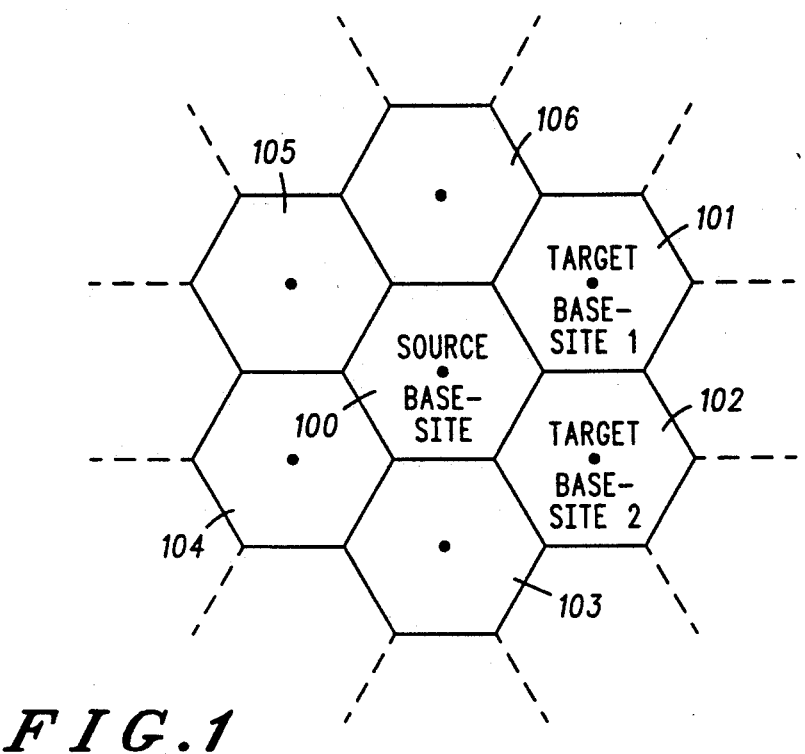
FIG. 1 depicts a geographic layout of a cellular radiotelephone network.

FIG. 1 depicts a portion of the geographic configuration of a typical cellular radiotelephone network (RTN), consisting of cellular radio service area (cells) 100-106. A source cell 100 is bounded by target cells 101-106, each equipped with one or more RF transceivers, hereinafter referred to as base-sites. The source cell 100 receives its designation because it is communicating with a mobile unit that is travelling within the geographic boundaries of that particular cell. It will be appreciated therefore, that any cell within the network may be termed source and/or target, depending upon its relationship to a particular mobile unit. The same convention applies to the base-sites within each cell.

Figure 2:
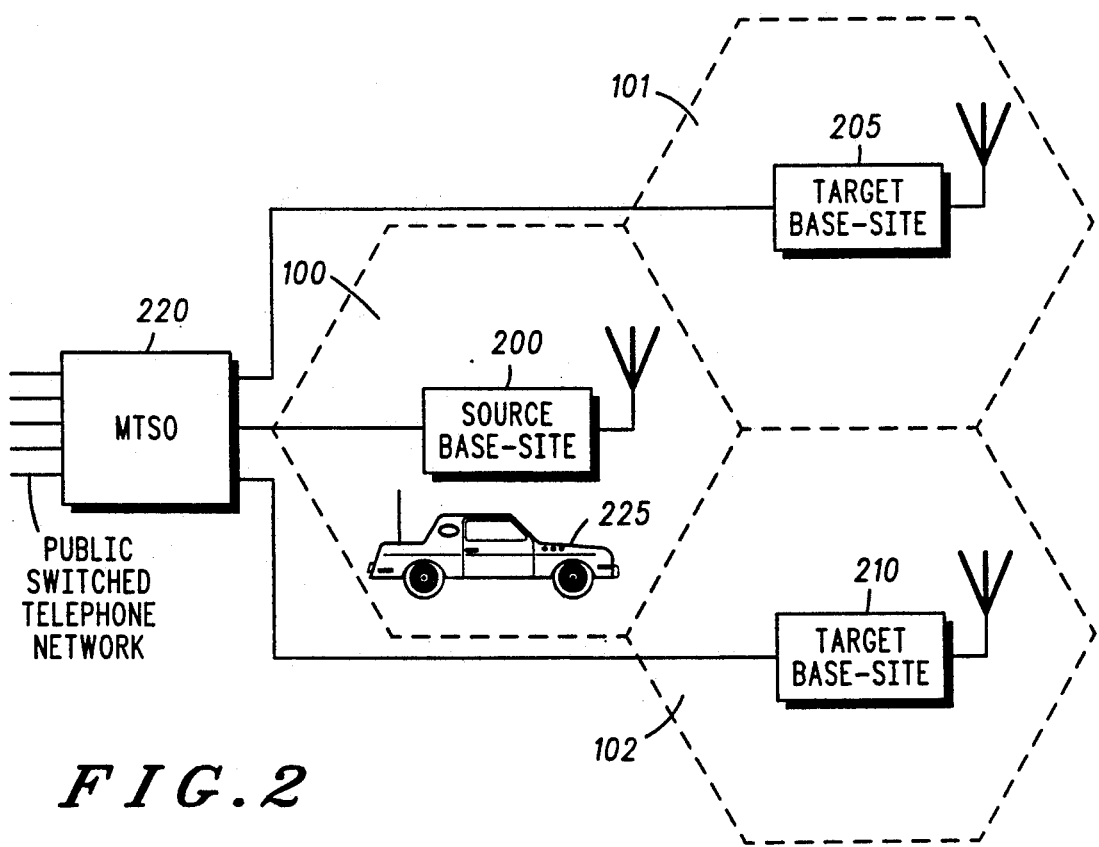
FIG. 2 depicts a mobile unit communicating to a source base-site and moving toward two candidate target base-sites.

FIG. 2 shows an expanded view of the source cell 100 and potential target cells 101 and 102. As is conventional, source base-site 200 and target base-sites 205 and 210 are interconnected and controlled by a Mobile Telephone Switching Office (MTSO) or switch 220, which in turn interfaces with the public switched telephone network (PSTN) and with other MTSOs within the RTN. During operation, the mobile unit 225 establishes RF communications within source cell 100 via the source base-site 200 as it moves towards target cells 101 and 102. The source base-site 200, in turn, couples to the MTSO 220 via dedicated facilities. The MTSO thus provides the mobile unit 225 with switched communications with other mobiles within the RTN or switched communications with the PSTN.

A complete description of the fixed and mobile hardware and software necessary to implement the RTN of FIGS. 1 and 2 is well documented and well within the knowledge of those skilled in the art and will not, therefore, be provided at this time. Interested readers may, however, refer to "DYNA T.A.C. TM Systems description." Instructional Manual 68P81150E01-A, available from Motorola Inc., Technical Writing Services, 1301 E. Algonquin Rd, Schaumburg Ill., 60196, hereby incorporated by reference.

Suffice it to say, however that each MTSO comprises a software-driven, computer-controlled telephony switch that performs functions including but not limited to:

providing communication and signalling connections between the RTN and the PSTN, providing signalling data communication connections with other elements of the RTN, providing communication and signalling connections between the MTSO and mobile subscribers (commonly referred to as the Air Interface), via the RF means administering the usage of RF channels available to the associated radio service area, providing control over the "hand-off" of calls between cells, and recording billing information. An example of a MTSO that has been used in connection with existing RTNs is the EMX 2500, available from Motorola, Inc. Literature describing this device has in the past been available at the above-provided address.

Figure 3A:
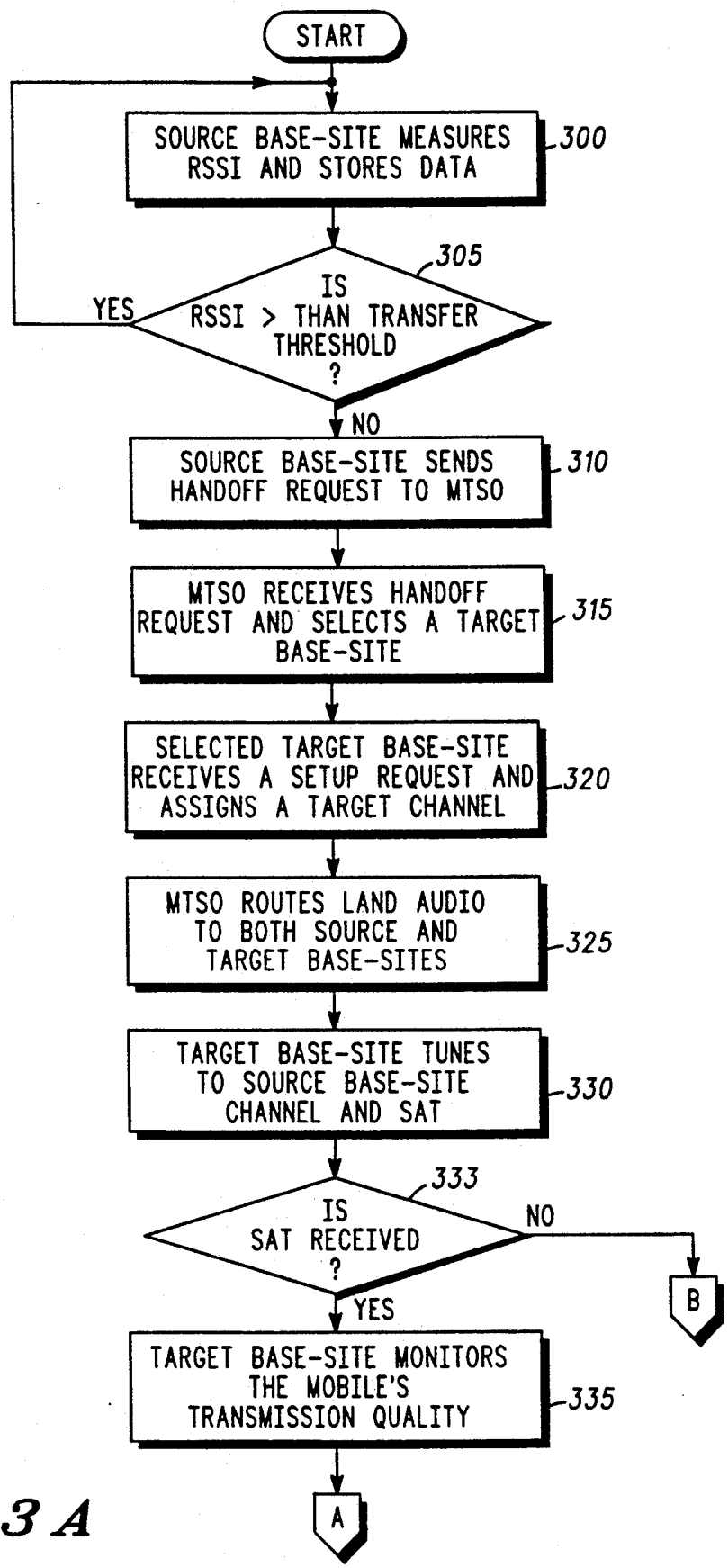
FIGS. 3A and 3B depict a flow chart diagram of the steps involved in transferring communication of a mobile unit operating within a cellular radiotelephone communication system in accordance with the present invention.
Figure 3B:
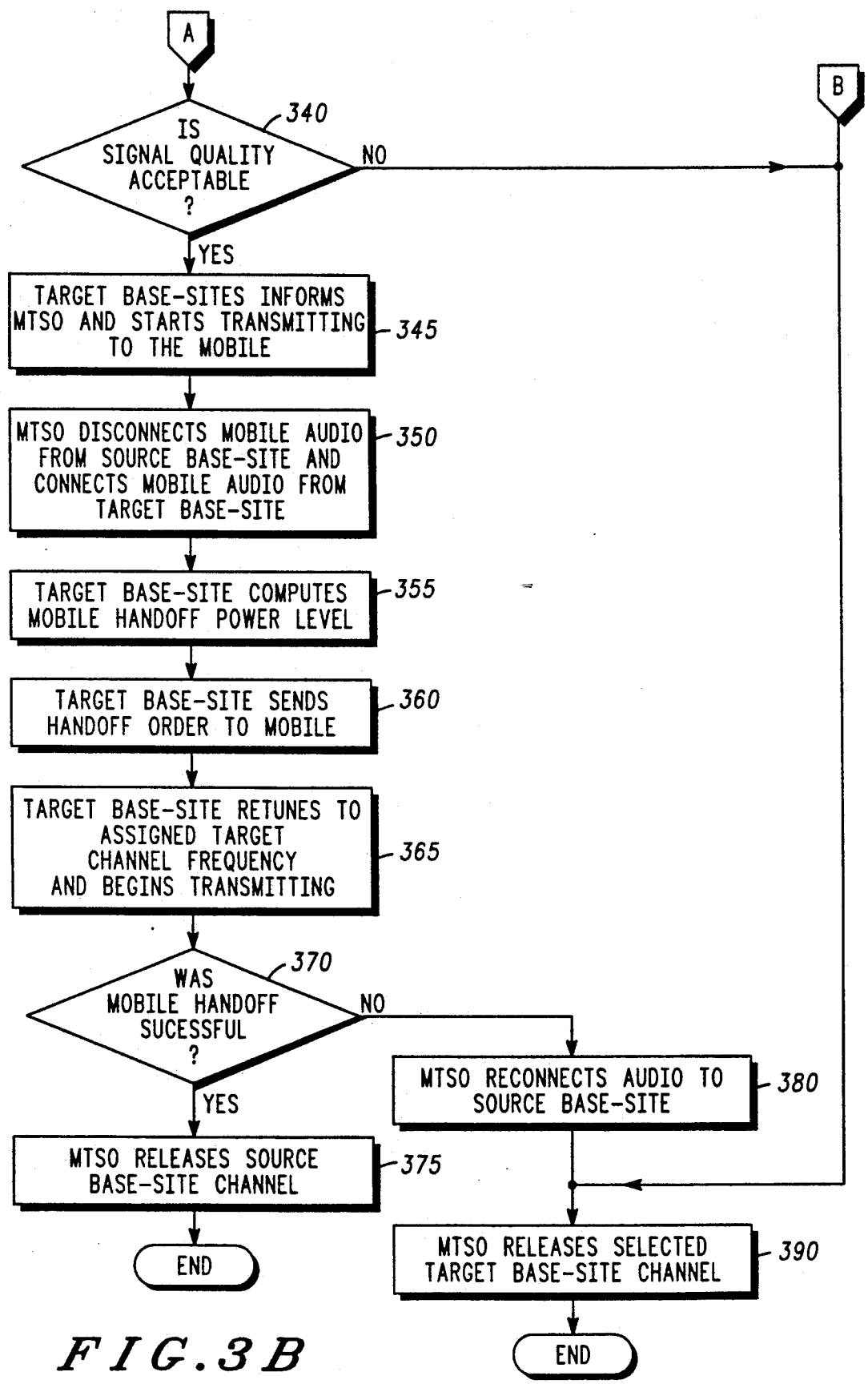

FIGS. 3A and 3B, together, depict a flow chart diagram of the communications transfer, hereinafter referred to as a "handoff" procedure, the system performs as the mobile unit 225 moves away from the source base-site 200 to which it is in communication. Referring to FIG. 3A, the handoff procedure commences at block 300 where the source base-site 200 measures the mobile's received signal strength (RSSI) and stores the data as a signal quality indication. A test is then performed at block 305 to determine if the mobile's RSSI is greater than a predetermined transfer threshold. If the value of RSSI is greater than the threshold, flow branches back to block 300 where the source base-site 200 continues to monitor and store the mobile's RSSI. If the value of RSSI falls below the transfer threshold, however, flow proceeds to block 310, where the source base-site 200 sends a handoff request to the MTSO 220.

In an analog cellular radiotelephone system, the MTSO 220 receives a handoff request from the source base-site 200 at block 315 and relays a message to potential target base-sites 205 and 210. Each target base-site will then monitor the quality of transmission of the mobile unit 225 and if required conditions are met, respond back to the MTSO that it is a potential candidate. Thereafter, the MTSO will select a target base-site from the replies received. If no potential candidates are identified, however, additional action will be taken by the MTSO and the source base-site 200 to repeat the entire process.

In a digital cellular radiotelephone system, the procedure is somewhat modified in that the mobile 225 is capable of measuring channels within each potential target cell, as instructed by the system, as well as measuring its current channel. The mobile reports this information back to the MTSO 220, which in turn, at block 315, selects a target base-site from the information received from the mobile unit.

At block 320, the selected target base-site 205, receives a handoff setup request from the MTSO 220. Thereafter, the selected target base-site assigns or reserves a communication channel, hereinafter referred to as the target channel, and notifies the MTSO of the target channel's ID. At block 325, the MTSO responds by routing land audio to both the target and the source base-sites, respectively.

Flow proceeds to block 330, where the target base-site 205, under direction of the MTSO, tunes, i.e., keys or adjusts the operating frequency of the target channel's transceiver circuitry, to the source base-site channel frequency upon which the mobile unit 225 is communicating and listens for the appropriate supervisory audio tone (SAT). As is conventional three SATS are set aside for the entire RTN at 5970, 6000 and 6030 Hz. Only one of these is employed at a given cell site, thus the SAT transmitted by the source base-site 200 is different from the SAT transmitted by the target base-site 205. Accordingly, when a mobile unit receives a SAT from a cell site, it transponds it back (i.e., closes the loop). The cell site, in return, looks for the specific SAT it sent to be returned; if some other SAT is returned, the cell interprets the incoming RF power as being corrupted by interference.

In accordance therewith, a test is performed at block 333 to determine if the target base-site receives the SAT transponded by the mobile unit 225 back to the source base-site 200. If not, flow branches ahead to block 390, where the MTSO will release the selected target channel and abort the handoff attempt. Else, flow proceeds to block 335 where the target base-site 205 monitors the mobile's transmission quality to verify the target cell's selection.

Referring to FIG. 3B, a test is performed at block 340 to determine if the mobile's signal quality is acceptable for communication within the target cell 101. If not, flow once again branches ahead to block 390, where the MTSO will release the selected target channel and abort the handoff attempt. Else, flow proceeds to block 345 where the target base-site informs the MTSO that the mobile's transmissions are acceptable and begins transmitting RF energy to the mobile on the selected target channel, at the source channel frequency. This method of target cell verification prior to actual handoff reduces the likelihood that the mobile will be handed off to a cell providing inferior service.

In response, the MTSO, at block 350, completes the audio handoff portion of the handoff procedure, by transferring control of the mobile audio from the source base-site 200 to the target base-site 205. Of importance, however, land audio is still provided to both the source and target base-sites by the MTSO. Thus, it will be appreciated by those skilled in the art, that by disconnecting mobile audio from the source base-site 200 and connecting the mobile audio from the target base-site 205, the present handoff procedure eliminates the need for a three party conference call circuit at the MTSO, as taught by the prior art.

Next, at block 355, the target base-site 205 computes the desired mobile handoff power level from the information gathered during target cell verification at blocks 330-340. Thereafter, flow proceeds to block 360, where the target base-site 205 transmits a handoff order to the mobile unit 225 on the selected target channel, at the source channel frequency. Since the target base-site has previously verified its ability to provide the mobile with quality service, target base-site directed handoff reduces the source cell's involvement. This strategic shift in the point of origin of the handoff order has the distinct advantage of avoiding several of the prior art problems associated with source cell directed handoffs.

For example, in current analog cellular systems, handoff processing is dependent upon state transitions of SAT generated by the mobile and transponded back to the source base-site. During a handoff, when the mobile's signal strength has fallen below acceptable levels, interfering mobile's can falsify SAT, thereby resulting in poor call quality during handoff. In extreme cases, the source cell may even lose radio contact with the mobile unit and be unable to direct the mobile unit to handoff, thereby resulting in a terminated call. As will be appreciated, a target cell directed approach to handoff will avoid those problems associated with and compounded by marginal source cell service prior to and during handoffs.

Immediately upon transmission of the handoff request, the target base-site 205, at block 365, re-tunes, i.e., keys or adjusts the operating frequency of the target channel transceiver circuit to the assigned target channel frequency and begins transmitting target cell SAT. As previously discussed, when the mobile unit 225 receives SAT from the target base-site 205, it transponds it back (i.e., closes the loop). At block 370, therefore, a test is performed to determine whether handoff was successful. If the mobile unit 225 transponds the appropriate SAT signal back to base-site 205, the cell interprets the incoming signal as a successful handoff, and flow proceeds to block 375 where the MTSO will release the source base-site channel and the handoff is completed. Else, flow branches to block 380, where the MTSO reconnects audio and directs the control thereof back to the source base-site 200, releases the selected target base-site channel at block 390 and aborts the handoff attempt.

As will be appreciated by those skilled in the art, this process of maintaining the source base-site channel until verification of successful handoff has the advantage over prior art handoff procedures, of assuring the mobile unit that the original serving channel is not torn down and thereby capable of providing continued service in the instance that the handoff order is never received.

What is claimed is:

1. In a cellular radio telephone communication system requiring a communication transfer from a source or serving base-site to a selected target base-site, said base-sites operating under the direction and control of a mobile telephone switching office (MTSO), a method for performing mobile unit handoffs, comprising the steps of:
   directing the target base-site to tune a transceiver circuit to and monitor the mobile unit's in progress call on the serving base-site's channel frequency;
   the target base-site directing the mobile unit to tune to a selected target base-site channel frequency;
   the target base-site re-tunning said transceiver circuit to the selected target channel frequency to commence communication with the mobile unit; and
   releasing the serving base-site channel upon arrival of the mobile unit onto the selected target channel frequency.

2. The method of claim 1 further comprising the steps of:
   the serving base-site determining that a mobile unit handoff is required; and
   the MTSO routing land audio to both the serving and the target base-sites.

3. The method of claim 1 wherein the steps of:
   directing the target base-site to tune a transceiver circuit to and monitor the mobile unit; and
   releasing the serving base-site channel, are performed under the direction and control of the MTSO.

4. The method of claim 1 wherein the step of monitoring the mobile unit's in progress call further comprises the steps of:
   measuring the mobile unit's signal strength; and
   determining if the target base-site can provide the mobile unit quality service.

5. The method of claim 4 further comprising the step of aborting the handoff if the target base-site cannot provide quality service.

6. The method of claim 1
   wherein the step of directing the mobile unit to tune to a selected target base-site channel frequency further comprises the step of:
   keying the selected target channel's transmitter circuit to transmit RF energy to the mobile unit, via the selected target channel, at the serving base-site channel frequency.

7. The method of claim 1 wherein the step of re-tuning the target base-site to the target channel frequency further comprises the step of:
   keying the selected target channel's transmitter circuit to transmit RF energy to the mobile unit, via the selected target channel, at the assigned target channel frequency.

8. The method of claim 1 wherein the step of the target base-site re-tunning the target channel transceiver circuit to the selected target channel is performed after the mobile unit is directed by the target base-site to tune to the selected target channel.

9. The method of claim 1 wherein the serving base-site continues to provide radiotelephone service to the mobile unit until a confirmation that the mobile unit has arrived onto the selected target channel, is received at the MTSO.

10. In a cellular radio telephone communication system requiring a communication transfer from a source or serving base-site to a target base-site, said base-sites operating under the direction and control of a mobile telephone switching office (MTSO), a method for performing mobile unit handoffs, comprising the steps of:
    determining that a mobile unit handoff is required;
    identifying a target base-site to hand the mobile unit to;
    directing the target base-site to tune a transceiver circuit to a serving base-site channel frequency and monitor the mobile unit's in progress call to verify signal quality; and
    aborting the handoff when the target base-site cannot provide the mobile unit with quality service; else
    the target base-site directing the mobile unit, via said transceiver circuit, to tune to a selected target base-site channel frequency different from the serving base-site channel frequency;
    the target base-site re-tunning said transceiver circuit to the selected target channel frequency to commence communication with the mobile unit; and
    releasing the serving base-site channel upon arrival of the mobile unit onto the selected target base-site channel.

11. The method of claim 10 further comprising the steps of the MTSO:
    routing land audio to both the serving and the target base-sites; and
    selecting a target base-site.

12. The method of claim 10 wherein the step of the target base-site re-tunning said transceiver circuit to the selected target channel is performed after handoff directions are sent to the mobile unit.

13. The method of claim 12 wherein the target base-site re-tunes a transmitter circuit to the selected target channel frequency prior to the mobile unit arriving on the selected target channel.

14. The method of claim 10 wherein the steps of:
identifying a target base-site;
directing the target base-site to tune said transceiver circuit to and monitor the mobile unit's in progress call;
aborting the handoff; and
releasing the serving base-site channel, are made under the direction and control of the MTSO.

15. The method of claim 10 wherein the serving base-site continues to provide radiotelephone service to the mobile unit until a confirmation that the mobile unit has arrived onto the selected target channel, is received at the MTSO.

16. A cellular radiotelephone system requiring a communication transfer from a serving base-site to a selected target base-site, said base-sites operating under the direction and control of a mobile telephone switching office (MTSO), comprising:
means, for directing the target base-site to tune a target channel transceiver circuit to and monitor the mobile unit's in progress call on a serving base-site channel to verify signal quality;
said target channel transceiver circuit, in communication with the mobile unit via the serving base-site channel, for directing the mobile unit to tune to a selected target base-site channel;
means, coupled to the target base-site, for directing the target base-site to re-tune said target channel transceiver circuit to the selected target channel after transmitting directions to the mobile unit; and
means, coupled to the serving base-site, for releasing the serving base-site channel upon arrival of the mobile unit onto the selected target channel.

17. The apparatus of claim 16, further comprising:
means, at the serving base-site, for determining that a mobile unit handoff is required; and
means, coupled to the serving and target base-sites, for routing land audio to both the serving and the target base-sites.

18. A cellular radiotelephone system requiring a communication transfer from a serving base-site to a selected target base-site, said base-sites operating under the direction and control of a mobile telephone switching office (MTSO), comprising:
means for determining that a mobile unit handoff is required;
means for identifying a target base-site to hand the mobile unit to;
means, coupled to the serving and the target base-sites, for switching audio to both the serving and the target base-sites;
means, coupled to the target base-site, for directing the target base-site to tune a target channel transceiver circuit to and monitor the mobile unit's in progress call on a serving base-site channel to verify signal quality;
said target channel transceiver circuit, in communication with the mobile unit via the serving base-site channel, for directing the mobile unit to tune to a selected target base-site channel different from the serving base-site channel;
means, coupled to the target base-site, for directing the target base-site to re-tune said target channel transceiver circuit to the selected target channel after transmitting directions to the mobile unit; and
means, coupled to the serving base-site, for releasing the serving base-site channel upon the arrival of the mobile unit onto the selected target base-site channel.

* * * * *